US008302019B2

(12) United States Patent
Litoiu et al.

(10) Patent No.: US 8,302,019 B2
(45) Date of Patent: Oct. 30, 2012

(54) SYSTEM AND METHOD FOR VISUALIZING PROCESS FLOWS

(75) Inventors: Marin Litoiu, Toronto (CA); Margaret Storey, Victoria (CA); Derek Rayside, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 2298 days.

(21) Appl. No.: 10/288,020

(22) Filed: Nov. 5, 2002

(65) Prior Publication Data

US 2004/0088678 A1    May 6, 2004

(51) Int. Cl.
*G06F 3/048* (2006.01)
*G06F 9/44* (2006.01)

(52) U.S. Cl. ........ 715/763; 715/765; 715/853; 715/967; 717/104

(58) Field of Classification Search .................. 715/744, 715/781, 763–765, 810, 815, 835, 841, 853–855; 717/100, 124, 125, 127, 131, 132, 104, 105
See application file for complete search history.

(56) References Cited

U.S. PATENT DOCUMENTS

| | | | | | |
|---|---|---|---|---|---|
| 5,187,776 | A | * | 2/1993 | Yanker | 715/800 |
| 5,504,853 | A | * | 4/1996 | Schuur et al. | 715/853 |
| 5,579,462 | A | * | 11/1996 | Barber et al. | 345/440 |
| 5,619,632 | A | * | 4/1997 | Lamping et al. | 345/441 |
| 5,689,628 | A | * | 11/1997 | Robertson | 345/427 |
| 5,751,288 | A | | 5/1998 | Oshima | |
| 5,835,085 | A | * | 11/1998 | Eick et al. | 715/853 |
| 6,037,939 | A | * | 3/2000 | Kashiwagi et al. | 715/798 |
| 6,097,393 | A | * | 8/2000 | Prouty et al. | 345/419 |
| 6,111,578 | A | * | 8/2000 | Tesler | 715/850 |
| 6,219,826 | B1 | | 4/2001 | DePauw et al. | |
| 6,225,998 | B1 | * | 5/2001 | Okita et al. | 715/853 |
| 6,278,464 | B1 | * | 8/2001 | Kohavi et al. | 345/440 |
| 6,326,987 | B2 | * | 12/2001 | Alexander | 715/771 |
| 6,356,285 | B1 | * | 3/2002 | Burkwald et al. | 715/853 |
| 6,380,951 | B1 | * | 4/2002 | Petchenkine et al. | 715/736 |
| 6,414,677 | B1 | * | 7/2002 | Robertson et al. | 345/419 |
| 6,496,208 | B1 | * | 12/2002 | Bernhardt et al. | 715/853 |
| 6,525,746 | B1 | * | 2/2003 | Lau et al. | 715/725 |

(Continued)

OTHER PUBLICATIONS

"Snap-Together Visualization: A User Interface for Coordinating Visualizations via Relational Schemata", by Chris North and Ben Shneiderman, University of Maryland, College Park, MD, http://www.cs.umd.edu/hcil.

(Continued)

*Primary Examiner* — Xiomar L Bautista
(74) *Attorney, Agent, or Firm* — Steven M. Greenberg, Esq.; Carey, Rodriguez, Greenberg & O'Keefe

(57) ABSTRACT

A method and system for visualizing process flows for business and manufacturing processes are described that includes a first view of the process as a tree showing the process elements and their interconnections, and a second view of the process in the form of a zoomable interface that displays selected nodes at magnifications that are continuously variable at the user's option. A selected node in the tree view opens the same node in the zoomable node view. When a second node is selected in the tree view, the zoomable node view zooms from the first selected node to the second selected node through each node intermediate between the first and second selected nodes. This enables a process analyst to view the content of selected process nodes in the context of nodes with which the selected nodes are associated and thus to have a thorough understanding of the process.

11 Claims, 6 Drawing Sheets

U.S. PATENT DOCUMENTS

| | | | |
|---|---|---|---|
| 6,714,936 B1 * | 3/2004 | Nevin, III | 707/102 |
| 6,816,175 B1 * | 11/2004 | Hamp et al. | 715/854 |
| 6,868,525 B1 * | 3/2005 | Szabo | 715/738 |
| 6,938,218 B1 * | 8/2005 | Rosen | 715/850 |
| 7,013,430 B2 * | 3/2006 | Jaffe | 715/771 |
| 2001/0035885 A1 * | 11/2001 | Iron et al. | 345/855 |
| 2002/0007483 A1 | 1/2002 | Lopez | |
| 2002/0033850 A1 * | 3/2002 | Bates et al. | |
| 2002/0089550 A1 * | 7/2002 | Orbanes et al. | 345/853 |
| 2002/0147805 A1 * | 10/2002 | Leshem et al. | |
| 2002/0174121 A1 * | 11/2002 | Clemie | |
| 2003/0056192 A1 * | 3/2003 | Burgess | |
| 2004/0090472 A1 * | 5/2004 | Risch et al. | 345/853 |
| 2004/0133853 A1 * | 7/2004 | Poerner et al. | 715/514 |

OTHER PUBLICATIONS

"A Multi-Windowed Environment for Simultaneous Visualization of Related algorithms on the World Wide Web", Thomas L. Naps and Eric Bressler; Lawrence University, Copyright 1998.

* cited by examiner

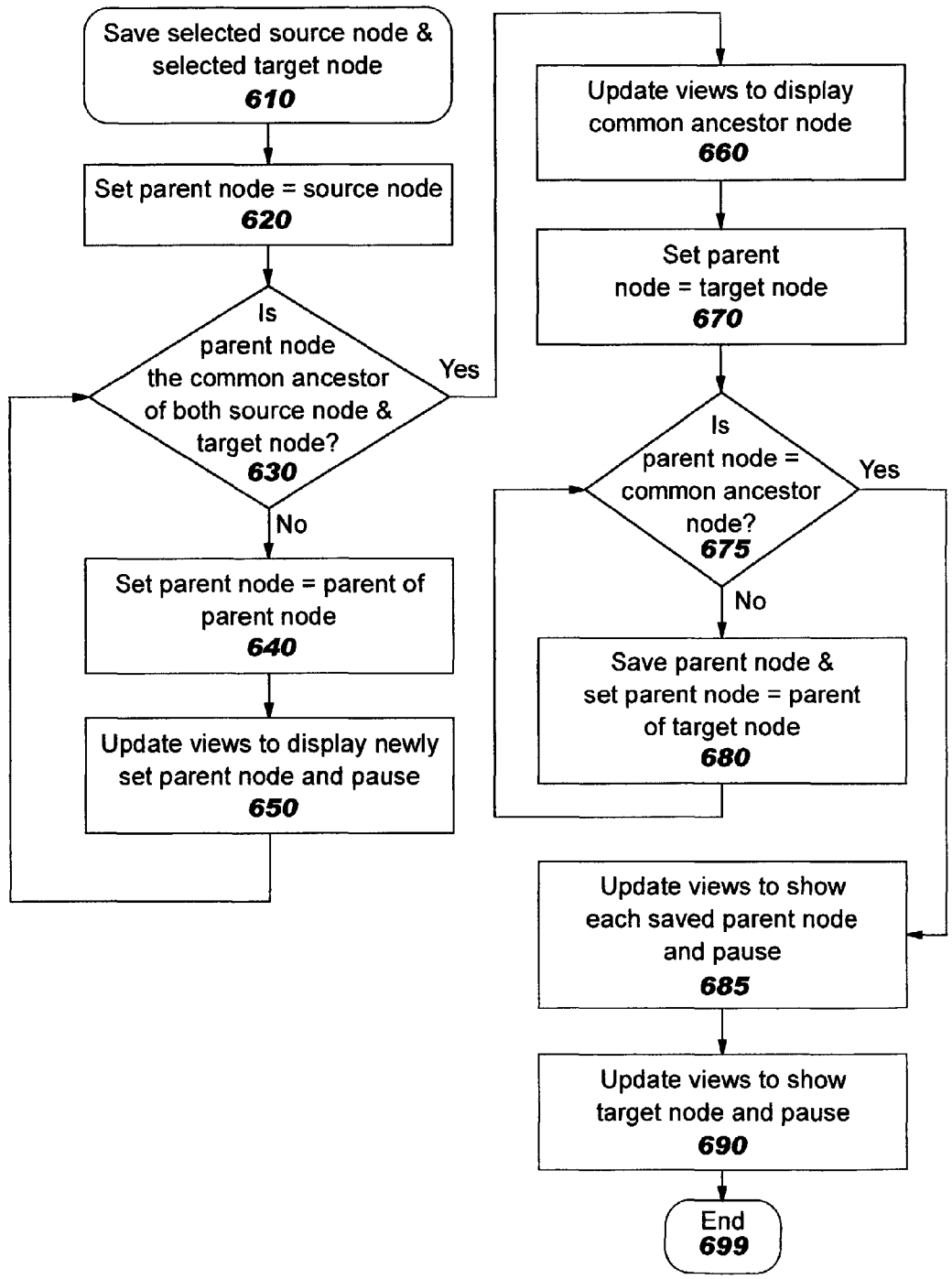

SYSTEM AND METHOD FOR VISUALIZING PROCESS FLOWS

FIELD OF THE INVENTION

The present invention relates to visualizers for process flows. More particularly, the present invention relates to improvements in visualizers that facilitate viewing of large process and software entities and promote examination and understanding of large and small portions thereof in context.

BACKGROUND OF THE INVENTION

Flow diagrams are graphical descriptions of the flows of data and control in software systems. They are made up of nodes interconnected through arrowed lines. Nodes denote actions or components. The lines identify the data flow and the control flow between the actions or components. Several commercially available tools implement some forms of flow diagrams; WebSphere®, MQIntegrator®, Lotus® Workflow™ and more recently WebSphere Studio Application Developer Integration Edition are examples of such tools.

There are many specific kinds of technical flow diagrams, for example, Petri nets, data flow diagrams, state charts, process dependency diagrams activity diagrams, and workflows. In addition, several software developers produce middleware products that also have specific kinds of flow diagrams associated with them. In these products, the programmer, business analyst or system integrator, draws flow diagrams that are executed by associated runtime environments. The flows in these products are classified as nano-flows, micro-flows and macro-flows (also known as workflows). An example of tool and engine for micro-flow is MQIntegrator®, a program product of IBM Corporation for message routing and content reformatting, that allows the programmer to draw message-flow diagrams that describe the movement of data between information systems. The associated runtime environment executes these diagrams: i.e. combines, transforms, and delivers the messages. MQIntegrator is typically used to integrate information systems when large corporations merge with former competitors. Macro-flows use large-scale granular activities and are deployed by large-scale software components such as applications. Workflow products that model and implement business processes are examples of macro-flows. Nano-flows are flows of data and control that take place inside an object or object method. In many products, nano-flows model and implement the wiring of Java classes into programs that access legacy applications. Nano-flow, micro-flow, and macro-flow diagrams can be modelled with an extension of Meta Object Facility (MOF), called Flow Composition Model, as was previously reported by Litoiu et al. in "Flow Composition Modeling with MOF", Proceedings of ICIES, 2001, Setubal, July 2001. Flow Composition Model is in the process of becoming an Object Management Group (OMG) standard. Meta Object Facility and Flow Composition Model are typically serialized in the XML Metadata Interchange (XMI) format based on eXtensible Markup Language (XML).

A second type of charting is frequently used for describing technical, business and other processes. This type of chart can describe parallel process steps, for example a credit granting process that includes steps of, for example, reviewing credit history, examining collateral and preparing account information, which can be carried out at the same time and which do not necessarily have dependencies each upon the other. This type of chart is typically in the form of a hierarchical tree, and includes nodes that usually contain multiple steps, each step being a child node that contains more detailed steps, and so on down to the simplest part of the process which usually contains text or code defining the process at its most detailed level. This lowest type of node is called a leaf node. A leaf node has no child nodes.

Flow diagrams are hierarchically composed. That is, a node in a flow diagram can itself be a flow diagram. There can be many levels in the hierarchy. Understanding hierarchically composed diagrams is difficult, especially with the current tools. For example, to understand what a node is really doing, the user has to open a new session or new window of the editor and then look at the flow implemented by that node. Given that there might be tens or hundreds of nodes, to see all these nodes, the user has to open as many sessions or windows. Further, the known prior art methods provide no convenient way of navigating through the large number of nodes that are present in a complex business or manufacturing process, or a complex software package.

North and Shneiderman, in "Snap-Together Visualization: A User Interface for Coordinating Visualizations via Relational Schemata", Proceedings of the Working Conference on Advanced Visual Interfaces, ACM, 2000, pp 128-135, describe a flow visualization method with display of multiple panes of information including tree and hierarchical information. Naps and Bressler, in "A multi-windowed environment for simultaneous visualization of related algorithms on the World Wide Web", SIGSE 1998, pp 277-281, describe a program visualization method using multiple windows. In De Pauw et al, U.S. Pat. No. 6,219,826 B1, a method is described for visualizing the execution of an object-oriented program wherein each node in a tree represents an object, and each edge between nodes represents a message between objects. Lopez, in US Patent Application Publication US2002/007483 A1, describes a flow structure markup language used for flowchart program editing and navigation for a range of programming languages. Other forms of visualization are described in U.S. Pat. Nos. 6,278,464 B1 and 5,751,288.

Despite various methods known in the art for depicting program flows, process flows and general flow illustration, there is a need for flow depiction that enables more complete understanding, particularly of complex business and industrial process flows. It would be desirable to have a viewer for manufacturing, technical and business process flows that permitted the user to view a selected portion of a flow diagram at any desired magnification, to view selected nodes in closed or in open mode, and to view a hierarchy of nodes in order to understand the depth and complexity of the process flow.

SUMMARY OF THE INVENTION

Accordingly, the present invention provides a method and system for examining a business or technical process that enables the user, viewing a flow diagram, to focus on the large picture or a small set of details in any desirable level of magnification, by zooming in or out in the same manner as a zoom camera lens, to see simultaneously the position in the process occupied by the details being viewed, and to cause the system to zoom automatically to display in a zoomable node view of the process, nodes selected by a user from a hierarchical view. The present invention further provides a method and system for examining a business or technical process that enables the user to view any selected node at each level in a hierarchy of nodes in the process by simple means. The present invention further provides a method and system for examining a business or technical process that depicts the depth of a hierarchy of nodes in the process. The present invention further provides a computer readable memory containing software code that implements a system for examining a business or technical process, the system having the characteristics listed above. The present invention further provides a computer readable memory containing software code that implements a method for examining a business or technical process, the method having the characteristics listed above.

The invention can be implemented on a computer system at least as powerful as a typical desktop or laptop, having a central processing unit, a display, a program and data storage device such as a disk drive, and input devices including keyboard and pointer controls. As such computer systems are well known, no further description will be given herein.

The invention is typically used in combination with one or more process abstraction tools that prepare lists of the process components and how the components interact. Such tools include WebSphere Studio Application Developer Integration Edition, a product of IBM Corporation. The lists and files prepared by the tools provide the raw material for process analyser software to depict the process components and their interactions. Such software is sometimes called fact extractor software, (especially in the software reverse engineering community).

BRIEF DESCRIPTION OF THE DRAWINGS

A preferred embodiment of the invention will now be described by reference to the accompanying drawings, in which:

FIG. 6 is a flow chart of a preferred method of automatically viewing and zooming through several nodes in a zoomable node view of a process.

DESCRIPTION OF THE PREFERRED EMBODIMENTS

Figure 1:
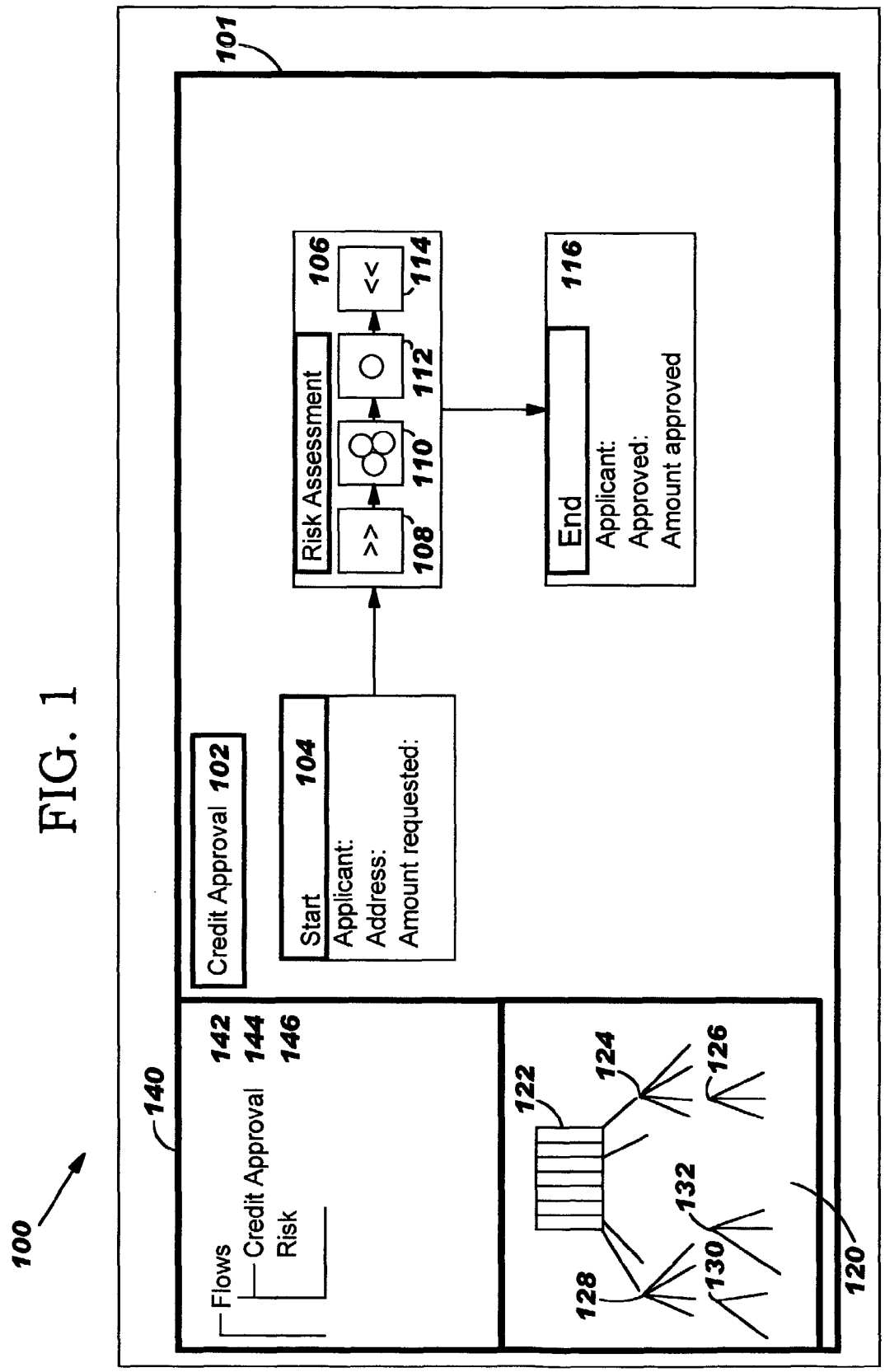
FIG. 1 illustrates a preferred embodiment of the invention including a three-pane representation of a diagrammed process.

Essentially, the method and system of the invention incorporates a system comprising a viewer including two panes. A first pane is a main view of the process being examined, which will be described herein as a zoomable node view. The zoomable node view includes a parent node and each child node that stems from the parent. A parent node can be presented as closed, that is, effectively a black box, or as open, in which the child nodes for the parent are visible within the parent node. Thus the user has the power to control the complexity of the zoomable node view for better understanding of the process. Each of the child nodes can be viewed with its own children, by a zooming technique to be described in detail below, which can be initiated by any convenient means, for example, by positioning a cursor over the desired node and clicking with a mouse or other convenient device. The user's action repositions the zoomable node view on the desired child node, and a similar action can be used to view each child node in turn until a leaf node is viewed. A leaf node is a child node that has no further children, and usually contains code or text relating to a lowest level item in the process being analysed. Conversely, when positioned on a child node, the system can be made to move up to the immediate parent node by an appropriate user interface action, for example, clicking or double-clicking a mouse button. The system then shows the parent node, and the user can move to its parent in turn, or to other child nodes, as desired to understand the process being analysed.

A second pane in the preferred embodiment shows a tree diagram, which will be called herein a hierarchical view, which illustrates a hierarchy of items in a process being analysed, and their relationship to each other. In particular, their parent-child relationships are visible in the hierarchical view. In the preferred embodiment, the parent in the hierarchical view is the overall process, and the children at various levels illustrate the sub-processes that are incorporated into the overall process.

An essential element in the invention is the coupling between the first pane showing the zoomable node view of a process and the second pane showing the hierarchical view of the process. The second pane is coupled to the zoomable node view such that if the user positions a cursor over a specific node in the tree view, and takes an action, for example, a mouse click, then the zoomable node view opens the node selected in the hierarchical view. Further, if the user clicks on a second node in the hierarchical view, the zoomable node view zooms out through each node in turn up to the nearest parent node from which the second node can be reached, then down to the second node. Optionally, the zooming action pauses at each intermediate node during the view transition from first node to second node, thus enabling the user to see the environment of each node in turn and better understand the process flow. Optionally, the system can be set to stop a zooming action at any point by means of a user action, for example a right-click of a mouse button, or pressing a particular key on a keyboard.

It is possible within the scope of the invention, to display the hierarchical view in a separate window from the window that displays the zoomable node view. While the underlying implementing mechanisms will be substantially the same as if the two views are displayed in two panes in the same window, a user would have to toggle between the two views, and thus the usability and convenience for the user would be degraded. Thus it is preferred to display both panes in the same window.

In a preferred embodiment, each of the changes of view in the main pane is accomplished by smooth, that is substantially continuous, zooming. Thus the image shown on a display grows larger or smaller in small increments until the desired node becomes the focus of the display. The speed of the zooming action can be varied to accommodate differing user preferences. Optionally, pauses can be built into the system which briefly stop the zooming action either as a result of or in the absence of a particular user action. That is, the default can include or exclude a pause, using default selection means well known in the art. Pauses are particularly useful to a user who wants to maintain an understanding of the relationship of the node contents to other nodes. Zooming can be accomplished by any appropriate user signal, for example pressing a mouse button when the pointer is placed over a node on which the user wishes to zoom in. A different user action can be employed to zoom out, for example pressing a third mouse button or pressing a function key.

Zooming may be considered as a special form of computerized animation, and can be performed using several approaches known to the person skilled in the art, for example geometric zooming, semantic zooming and fisheye zooming. In geometric zooming, the entire image is scaled around a specific point in the view. In semantic zooming, a selected non-leaf node will open to display its children nodes if they are not already visible, and a selected leaf node will open to show the related code segments or text annotations automatically. Fisheye zooming provides for a selected portion of a flow diagram to be magnified to any desired degree while maintaining focus on the selected portion, while at the same time portions of the flow diagram surrounding the selected portion shrink to a corresponding desired degree around the selected portion of the flow diagram. For convenience, this disclosure assumes, without loss of generality, that geometric zooming is being used.

An optional third pane illustrates aspects of the process being analysed in a format similar to the showing of folders in a disk drive as is common on personal computers and workstations. This can be used as a navigator pane, for example, for showing parts of a larger process, as will be discussed in more detail below.

FIG. 1 depicts an example of a simultaneous display 100 of a Credit Approval process in a Hierarchical View pane 120, and occupying substantially the entire display space in Zoomable Node View pane 101, and listed in an optional navigator pane 140. Zoomable Node View 101 displays nested views of nodes that comprise a portion of the process flow depicted in Hierarchical View pane 120. The highest level node is overall credit approval 102, whose components include a start step 104, in which input data are supplied including an applicant's name, address, amount of credit requested, and other data that are important to granting credit approval in a business sense. Data supplied in start step 104 are analysed in risk assessment node 106. Within risk assessment node 106 are several child nodes that contain details to accomplish a risk assessment, namely nodes 108, 110, 112 and 114. The arbitrary symbols on nodes 108 to 114 are used merely to distinguish one node from another node, and are not intended to have inherent meaning. Following completion of risk assessment at node 106, business flow for the described process ends at step 116, wherein information is output, including the applicant's name, whether or not approved and the amount approved.

Also in FIG. 1, Hierarchical View pane 120 depicts the entire process being analysed, including a credit approval node 122 that corresponds to node 102 in Zoomable Node View 101 pane 101. An icon in the form of a square box hovering over credit approval node 122 indicates that credit approval node 122 is the node that is active in Zoomable Node View 101. Other nodes in Hierarchical View pane 120 correspond to nodes in Zoomable Node View 101, for example risk assessment node 124 corresponds to node 106 in Zoomable Node View 101. The tree representation can depict the entire business process; however, in the case of very complex processes, the tree itself can be a view of part of a process. Nodes 126, 128, 130 and 132 correspond to other nodes not shown in Zoomable Node View 101.

The functions of optional navigator pane 140 can be performed by any convenient means, for example a list of flows or processes can be placed in a separate window that, upon receiving a suitable signal from the user, opens a Zoomable Node View 101 and a Hierarchical View 130 in a program window. Systems that perform similar functions are known. In the system using the optional navigator pane 140, the navigator pane includes a summary item, Flows 142, and subsidiary items for each flow to be analysed, including in this example Credit Approval 102 and Risk 146. The user normally begins by selecting a process in the navigator pane 140, for example Credit Approval 102. Selecting the process to be examined can be performed by any convenient means, for example positioning a cursor over the word defining the desired process and clicking a mouse button. In a preferred embodiment, that action causes the Zoomable Node View pane 101 to display the Credit Approval flow 102 as described above.

Figure 2A:
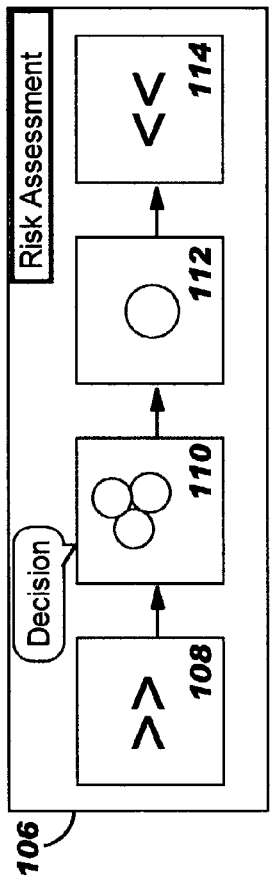
FIG. 2 depicts a preferred embodiment of the invention illustrating closing and opening of nodes, and manual zooming of a zoomable node view of a diagrammed process.
Figure 2B:
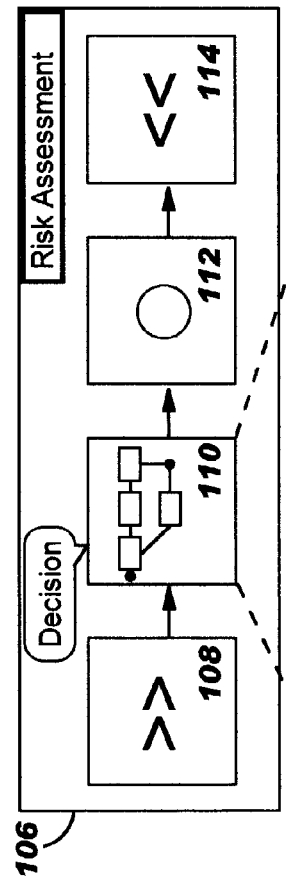

FIGS. 2a and 2b together depict the illustration of nodes in closed and open formats, respectively. "Open" and "closed" modes of a node will be described briefly. These two are the main modes. The "closed" mode typically displays an image or icon that represents what kind of node a particular node is. The "open" mode shows the "child" or sub-nodes. There may be, optionally, other modes that display other information about the node; for example, a prose description of what the node does. In FIG. 2a, Risk Assessment node 106 is shown, containing nodes 108, 112 and 114, together with Decision node 110. The symbols on nodes 108-114 merely indicate that each node is distinct from the other nodes within Risk Assessment node 106. Decision node 110 is shown in closed format, in which no internals of Decision node 110 are visible. Upon receipt of a suitable signal from the user, the system opens Decision node, now shown in FIG. 2b as node 110. A suitable signal can be any signal indicating which node is selected and what action is desired, for example positioning a mouse pointer over node 110 on a display and clicking on a mouse button. Opened Decision node 210 shows its internals which here include five subnodes and several edges, which will be described below.

Figure 2C:
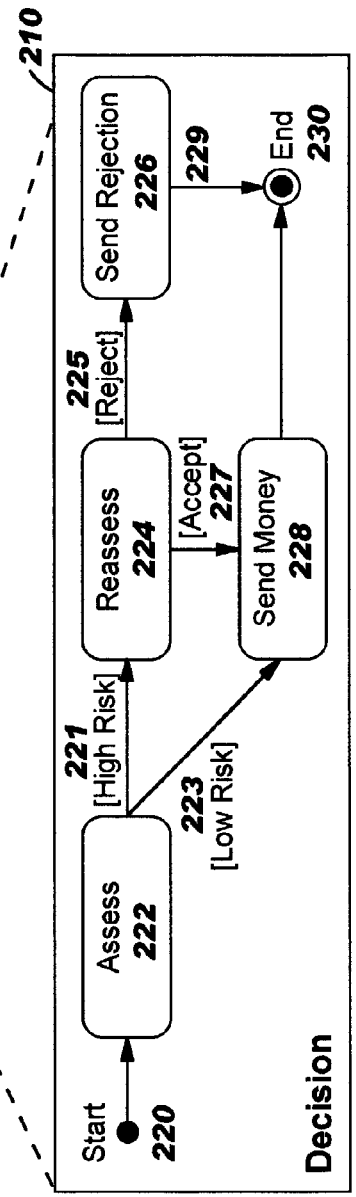

An important aspect of the invention is the combination of continuous zooming in a process flow analysis system with selection of one or more nodes to be viewed at a desired zoom level. While it is difficult to illustrate continuous zooming in a static document, FIGS. 2b and 2c depict a node before and after zooming, respectively. Risk Assessment node 106 includes subnodes 108, 112 and 114 as described with respect to FIG. 2a. Node 106 in FIG. 2b also includes Decision node 110. As described in FIG. 2a, Decision node 110 is displayed in closed mode, that is it is shown without the internal specifics of any subnodes. In FIG. 2b, Decision node 110 is shown in open mode, illustrating the internal subnodes. Prior to zooming in, Risk Assessment node 106 occupies substantially the entire display space. Upon receiving a signal from the user, the system zooms in to increase the size of node 106 so that now the internals are not only visible but also large enough to be labelled and their relationships shown. The zooming can be stopped at any magnification by the user; preferably the system includes a pause mechanism that stops the zooming at the point when the node 210 occupies substantially the entire display space. Where a node changes form between figures, in this disclosure the node is given a new but similar number, for example, 110 and 210, to distinguish the second form of the node from the first form of the node. In FIG. 2c, subnodes within Decision node 210 can now be viewed and read, including a Start position 220, an Assess node 222, which has output edges for High Risk 221 and Low Risk 223. High Risk 221 leads to a Reassess node 224, which has output edges for Reject 225 and Accept 227. Low Risk 223 and Accept 227 lead to Send Money node 228. Reject edge 225 leads to Send Rejection node 226, and both Send Money 228 and Send Rejection 226 have output edges leading to End 230. Any of the nodes within Decision node 210 can have further child nodes, which for clarity are not shown.

Figure 3A:
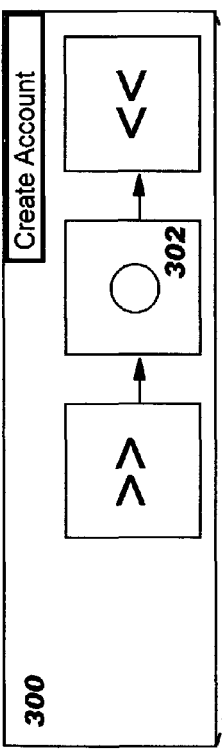
FIGS. 3a, 3b, 3c, and 3d illustrate a multi-stage zooming activity of a preferred embodiment of the invention.
Figure 3B:
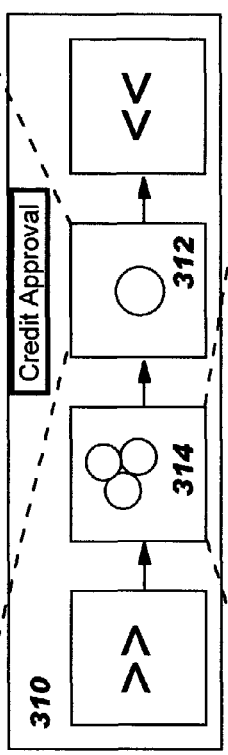

FIGS. 3a to 3d depict sequentially an embodiment of the invention in which the selecting of two nodes in the Hierarchical View causes the main Zoomable Node View to zoom sequentially from a first selected node through intermediate nodes to a second selected node. In FIG. 3a, node A was selected first in Hierarchical View 305 by the user, and node B was selected second.

After the selection of node A, Zoomable Node View 300 shows the Create Account node including several subnodes shown in closed form. Following the selection of node B in Hierarchical View 305, the system first searches the process information in a manner to be described below with reference to FIGS. 4 and 5, and determines which nodes are in a most direct path from node A to node B. The system then moves an icon in Hierarchical View 315 in FIG. 3b to a first node in a path from the first-selected node A to the second-selected node B. In the example, the first node in the path is the highest level node C, and the system substantially simultaneously zooms out in the Zoomable Node View to show node C, which is Credit Approval node 310. Create Account node 302, which formerly occupied substantially the entire display space, has become node 312 in the higher level view now depicted in Zoomable Node View 310. Risk Assessment node 314 is shown as a closed node in Zoomable Node View 310, together with other nodes. The system pauses at this zoom level, and optionally the user can signal the system to hold, for example by a mouse click, or can allow the system to proceed to the next zooming action.

Figure 3C:
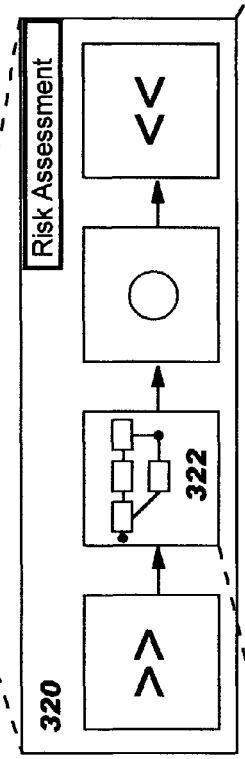

In FIG. 3c, the icon in Hierarchical View 320 has moved to node D, and the Zoomable Node View 320 now shows Risk Assessment node 314 opened and expanded. Inside Risk Assessment node 314, now shown occupying the entire display, are several nodes including Decision node 322. The system again pauses at this zoom level, and in the absence of a signal to hold, the system proceeds to the next zooming action.

Figure 3D:
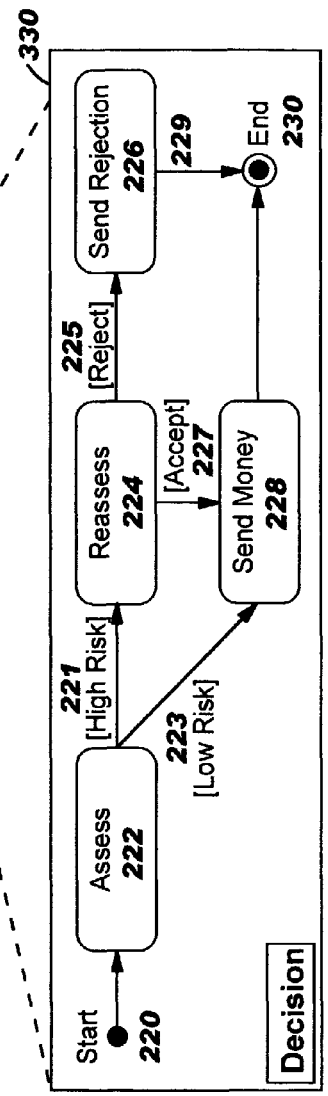
Figure 3D:
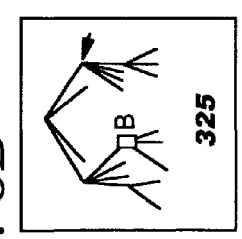

In FIG. 3d, the icon in Hierarchical View 325 has moved to node B, the node selected originally by the user, and, as described with respect to FIG. 2, the Zoomable Node View 330 now shows Decision node 322 expanded and occupying substantially the entire display. The component nodes within Decision node 330 are Start 220, Assess node 222 having output edges High Risk 221 and Low Risk 223. High Risk 221 is input to Reassess node 224, which has output edges Reject 225 and Accept 227. Reject edge 225 is input to Send Rejection node 226 which has the sole output edge leading to End 230. Accept edge 227 leads to Send Money node 228. Low Risk edge 223 leads to Send Money node 228, which in turn leads through sole output edge 231 to End node 230.

Figure 4:
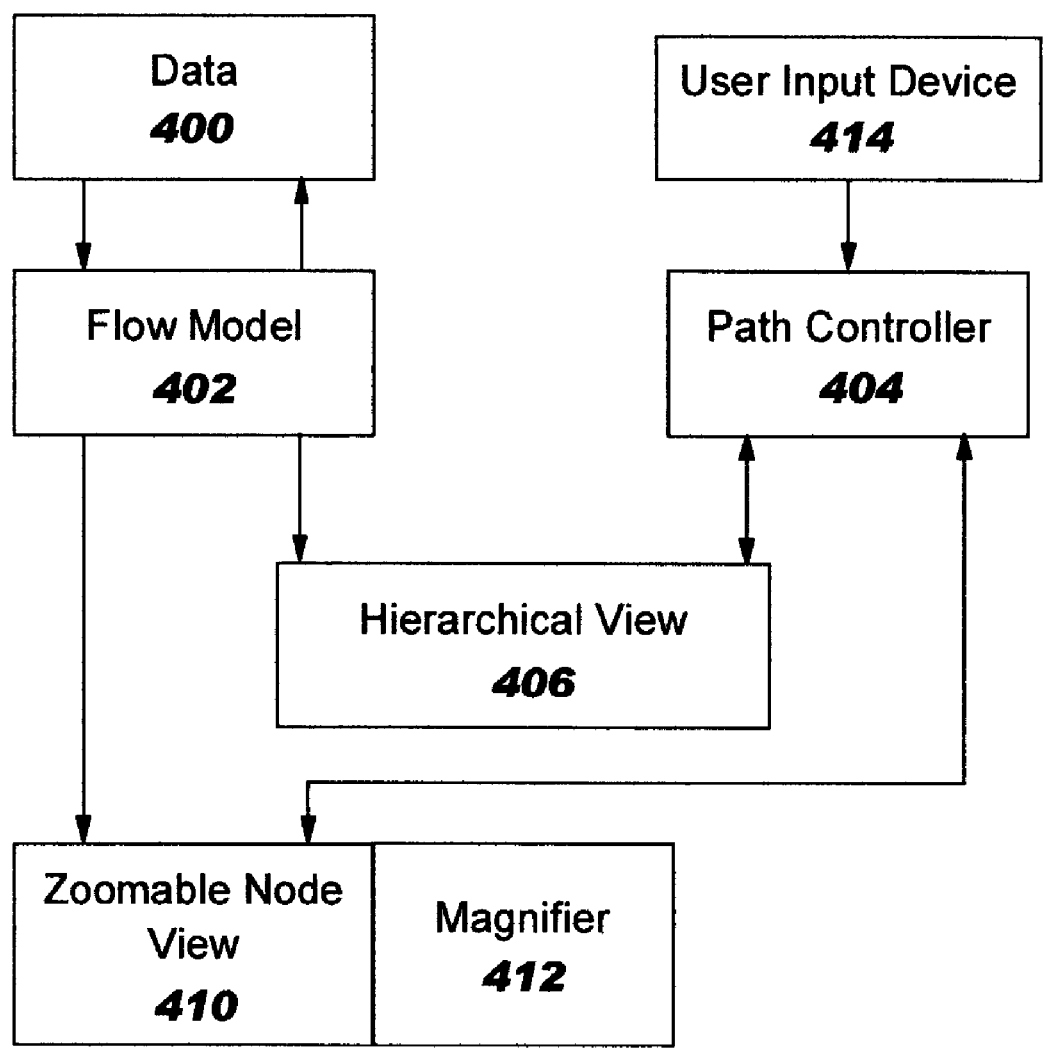
FIG. 4 is a block diagram of components of a preferred embodiment of a flow viewer system that provides interaction between a hierarchical view and a zoomable node view of a process.

FIG. 4 is a block diagram illustrating the components of a preferred embodiment of an overall flow viewer system. Data element 400 is stored on any convenient storage unit, for example a disk drive, and it includes information about the process that is to be viewed, comprising artifacts and the relationships among artifacts, prepared by a data gathering system. As described above, several data gathering systems are known in the art that can collect information to feed the viewing system of the invention. Data element 400 feeds information to and receives information from Flow Model 402. Flow Model 402 also sends data to Path Controller 404.

Flow Model 402 contains the data of interest to the user; in this case a flow diagram. There may be many views of a flow model. In the context of this invention there are two main views, the Zoomable Node View and the Hierarchy View. The kind of model preferably used to represent flow diagrams in this invention is a directed, typed, multi-graph. This is a graph in the mathematical or graph-theoretic sense, and not a visual representation. Visual representations are handled by the views. "Directed" means that edges go from a "source" node to a "target" node. "Typed" means that the nodes and edges each have a type. "Multi" means that there may be more than one edge between any pair of nodes. The elements in the model keep track of their parent nodes and child nodes in the hierarchy as well as other information that is preferably stored in only one place. A view shows at least some of the things that are in Flow Model 402. Although Flow Model 402 can in practice be frequently updated, for the purposes of the invention fow model 402 can be assumed to be static. Ordinary updates to Flow Model 402 can be readily adapted by persons skilled in the art.

Path Controller 404 is the element of the invention that controls the zooming from a first selected node in Hierarchical View 305, 315, 320, 325 in FIGS. 3a to 3d. Path Controller 404 receives user signals from User Input Device 414, for example pointer positions and mouse clicks that identify a source node and a target node for which the user desires to see zoom views, and for which the user desires to see each node in a most direct path between the source node and the target node. Path Controller 404 also receives information from Zoomable Node View 410 about the information currently displayed, and sends instructions to Zoomable Node View 410 to display the selected node. As will be clear to the person skilled in the art, the information in Hierarchical View 406 that does not appear on the display space must be retained off-screen, and Hierarchical View 406 includes logic that performs that function. Hierarchical View 406 receives information from Flow Model 402 relating to the elements and relationships of the process being analysed, and creates a Hierarchical View as displayed in pane 120 of FIG. 1. Zoomable Node View 410 accepts information about the process being analysed from Flow Model 402, and creates the display by node shown in pane 101 of FIG. 1. Zoomable Node View 410 is more complicated than a regular (non-zooming) view. It is composed of two closely related parts, which we call the "logical view" and the "physical view" (following a long-standing use of these terms in the art). In essence, zooming or magnification is a computation that projects the logical view onto the physical view. Magnifier 412 is closely associated with Zoomable Node View 410, and causes the node displayed in Zoomable Node View 410 to zoom sufficiently that the selected node occupies substantially the entire display space, more fully described below with reference to FIG. 5.

Figure 5:
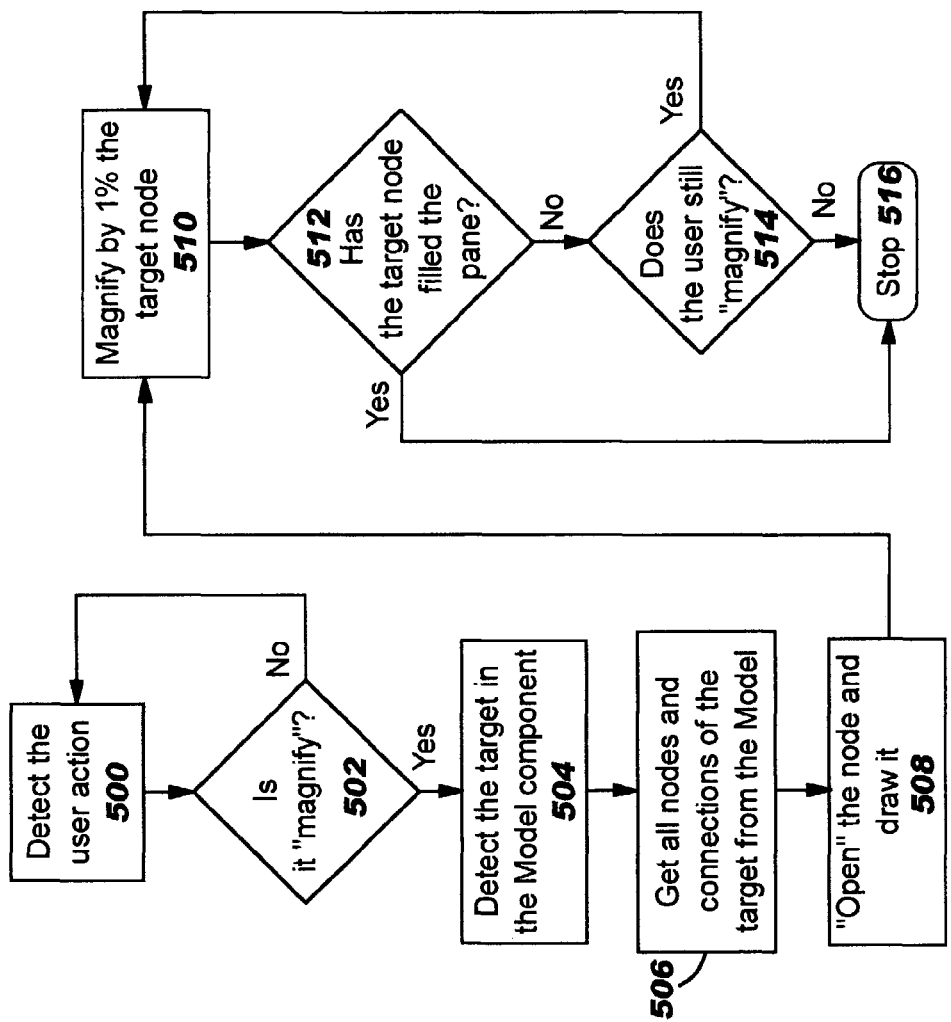
FIG. 5 is a flow chart of a method of manual zooming of a zoomable node view of a process.

FIG. 5 depicts a preferred embodiment of a navigation method that provides manual zooming of the Zoomable Node View depicted in pane 101 of FIG. 1 and element 410 of FIG. 4. The first step is to detect a user action at 500. Decision step 502 determines whether the user action is "magnify". If Yes, then the method proceeds to step 504 and detects the target in the Model component. If No, then the system returns to step 500. After detecting the target at step 504, the system gets in step 506 all nodes and connections of the target from the Flow Model, and proceeds to step 508 to open the selected node and draw that node in Zoomable Node View 410. The system then in step 510 magnifies by increments, conveniently by 1 percent increments, the target node. The system tests in decision step 512 whether the target node has filled the display space, also termed the pane, and if Yes, then proceeds to Stop 416. If No, the system tests at decision step 514 whether the user still requests "magnify". If Yes, the system returns to step 510 and increases the target node size by a further increment. If No, the system goes to Stop 416 and ceases adjusting the size of the target node. A similar set of activities occurs when the target node size is larger than desired, that is, when the user input returns a "demagnify" command.

FIG. 6 depicts a preferred embodiment for determining which nodes are on a most direct path between a user-selected first node and a user-selected second node. At step 610, the system saves both a selected first node, called for convenience a source node, and a selected second node, called for convenience a target node. In step 620, the system then sets the parent node equal to the source node. Then in step 620, the system tests whether the parent node is an ancestor of both the source and the target nodes. If No, then at step 640 the system resets parent node to the parent of the parent node. Then at step 650 the system updates the Hierarchical View to display an icon over the reset parent node and updates the Zoomable Node View to display the reset parent node in zoomed format occupying substantially the entire display space as described above with reference to FIG. 2. Preferably, the system pauses in step 650 to allow the user to view the new parent node in the Zoomable Node View. Then the system recycles to decision step 630 where it determines whether the newly set parent node is an ancestor of both the source and target nodes. If No, the loop continues with the objective of finding the first common ancestor for both the source and target nodes. If Yes, then in step 660 the system displays the newly set common ancestor node in both the Hierarchical View and the Zoomable Node View in the manner described above. In order to determine which nodes are intermediate between the common ancestor node and the target node, the system must check each parent of the target node in turn until it finds that the selected parent is the common ancestor node. Thus at step 670 the system sets a parent node equal to the target node. At step 675 the system tests whether the newly set parent node is the common ancestor node determined at step 630. If No, then at step 680 the system saves the parent node and sets a parent node equal to the parent of the parent node and recycles to decision step 675. The system continues the cycling until the newly set parent node is the common ancestor node. When the common ancestor node is reached, the system determines a Yes at decision step 675 and proceeds to step 685 in which the system updates the Hierarchical View and the Zoomable Node View to show each saved parent node from the common ancestor node to the parent of the target node, and preferably pauses at each updated set of views. Then at step 690, the system updates the views as above to show the target node and reaches the end step 699. Preferably the system then waits for further user input.

While we have described a preferred embodiment of the invention, it will be understood that persons skilled in the art may make various changes that will be within the scope of the appended claims. In particular, it is not necessary to use a specific Model-View-Controller architecture to build the invention, although it is highly convenient to do so. Therefore these claims are intended to cover all modifications that fall within the spirit of the invention.

We claim:

1. A computer system for visualizing process flows, said system comprising:
    (a) a display unit for depicting the process visually on a display;
    (b) a mechanism for depicting the process in a first pane of the display as a hierarchical tree view wherein each process element is represented by a respective node of the tree;
    (c) a mechanism for depicting a selected node of the tree in a second pane of the display as a zoomable node view; and
    (d) a zooming mechanism for zooming the display of the selected node in the zoomable node view, wherein the zooming mechanism includes a selection mechanism adapted to select a node in the hierarchical view, further comprising a coupling mechanism adapted to display in the zoomable node view the details of the selected node, and wherein the display of the selected node in the zoomable node view is magnified by increments until a determination that a user no longer requests for magnification or until the display of the selected node occupies substantially the entire display space of the second pane.

2. A computer system as claimed in claim 1, wherein the selection mechanism is further adapted to retain the selection of the first node in the tree, and to select a second node in the tree.

3. A computer system as claimed in claim 2, wherein the selection mechanism is adapted to analyse the nodes in the tree and identify each node in the tree intermediate the first selected node and the second selected node.

4. A computer system as claimed in claim 3, further including a zooming mechanism adapted to zoom continuously from the zoomable node view of the first node selected in the hierarchical view to the detailed display of the second node selected in the hierarchical view.

5. A computer system as claimed in claim 3, wherein the zooming mechanism is further adapted to pause at the displaying, in the zoomable node view, of each node intermediate between the zoomable node view of the first node and the zoomable node view of the second node.

6. A computer system as claimed in claim 1, wherein the tree includes subtrees having a plurality of subtree nodes, wherein each of the subtree nodes is depicted in the hierarchical view.

7. A computer program product comprising a computer readable medium having a computer executable program of instructions embodied therein for directing a data processing system to implement the data processing system of claim 1.

8. A method for visualizing the flows of a process, said method comprising the steps of:
    (a) providing a display space adapted to display the process for viewing by a user, the display space having a first window pane and a second window pane separate from the first window pane;
    (b) in a first window pane, displaying said process in the form of a tree, said tree depicting substantially all events in the process in a hierarchical display wherein each event is displayed as a node and sub-events to the event are displayed as child nodes to the node;
    (c) in a second pane, displaying a selected node of the tree in a zoomable node view, wherein the selected node is selected in the first window pane; and
    (d) zooming the display of the selected node in the zoomable node view based on user request, wherein the display of the selected node in the zoomable node view is magnified by increments until a determination that the user no longer requests for magnification or until the display of the selected node occupies substantially the entire display space of the second window pane.

9. A method as claimed in claim 8, further comprising the preliminary step of collecting events/elements of the flows into a file.

10. A method as claimed in claim 8, further comprising the steps of:
    (a) upon selecting a node in the hierarchical view pane, displaying in the zoomable node view pane a detail view of the selected node;
    (b) upon receiving a user input signal selecting a second node in the hierarchical view pane, zooming the display in the zoomable node view pane sequentially to display a detail view of each node intermediate between the first selected node and the second selected node; and (c) finally displaying in the zoomable node view pane a detail view of said second selected node.

11. A computer program product comprising a computer usable medium having computer readable program code embodied therein for visualizing process flows, said medium comprising code means for causing a computer to effect the steps of any of claims 8 to 10.

* * * * *